(12) United States Patent  (10) Patent No.: US 7,609,008 B1
Kohler  (45) Date of Patent: Oct. 27, 2009

(54) METHOD AND CIRCUIT FOR CONTROLLING AN LED

(75) Inventor: Raymond Kohler, Souderton, PA (US)

(73) Assignee: MDL Corporation, Langhorne, PA (US)

( * ) Notice: Subject to any disclaimer, the term of this patent is extended or adjusted under 35 U.S.C. 154(b) by 0 days.

(21) Appl. No.: 12/246,052

(22) Filed: Oct. 6, 2008

Related U.S. Application Data

(60) Provisional application No. 61/059,531, filed on Jun. 6, 2008.

(51) Int. Cl.
*H05B 37/02* (2006.01)
(52) U.S. Cl. ............... 315/307; 315/185 R; 315/192; 315/224; 315/308
(58) Field of Classification Search ............ 315/192, 315/312, 291, 209 R, 185 R, 186, 191, 193, 315/307, 308, 224, DIG. 4; 345/82, 83, 84
See application file for complete search history.

(56) References Cited

U.S. PATENT DOCUMENTS 6,441,558 B1 * 8/2002 Muthu et al. ............... 315/149
7,262,559 B2    8/2007 Tripathi et al.
7,288,902 B1 * 10/2007 Melanson ................... 315/291
7,439,944 B2 * 10/2008 Huynh et al. ................. 345/82
2007/0182347 A1    8/2007 Shteynberg et al.
2008/0018261 A1    1/2008 Kastner

* cited by examiner

*Primary Examiner*—David Hung Vu
(74) *Attorney, Agent, or Firm*—Panitch Schwarze Belisario & Nadel LLP

(57) ABSTRACT

A control circuit coupled to a power line controlled by a dimmer having a switching device includes, for example, an active power factor correction circuit receiving power from a bridge rectifier and storage capacitor and drawing an average continuous current when the switching device is "on." An LED power driving circuit receives a controlled current from the active power factor correction circuit and generates an output current received by at least one LED outputting visible light. A positive voltage feedback circuit senses a feedback voltage across the LED, through the LED power driving circuit, and sends the feedback voltage to the active power factor correction circuit. A pump back power circuit is electrically coupled to the LED power driving circuit and applies a bias voltage to an output of the bridge rectifier to power the active power factor correction circuit when the switching device is "off."

8 Claims, 2 Drawing Sheets

METHOD AND CIRCUIT FOR CONTROLLING AN LED

CROSS REFERENCE TO RELATED APPLICATIONS

The application claims priority to U.S. Provisional Patent Application No. 61/059,531, filed Jun. 6, 2008, entitled, "Method and Circuit for Controlling and LED."

BACKGROUND OF THE INVENTION

An embodiment of the present invention relates generally to control circuits for use with standard dimmer switches, and more particularly, to an LED driver circuit for use with standard incandescent phase control dimmers.

With the rising costs of energy, the search continues for lighting solutions that consume less power and operate at a lower cost. Compact fluorescent light (CFL) bulbs were thought to be one energy efficient answer. However, CFLs contain a small amount of mercury (Hg), which makes disposal rather difficult since the bulbs cannot simply be thrown in the garbage. Additionally, the mercury from broken CFLs can present a health hazard if not promptly and properly cleaned up. The Environmental Protection Agency (EPA) has issued guidelines for cleaning up and disposing of CFLs.

Light emitting diodes (LEDs) are increasing in popularity. Significant advances have been made in LED technology to produce higher power at less initial cost to the consumer. LEDs last longer, are more efficient, and produce less heat than traditional incandescent light bulbs. LEDs also contain no mercury.

One disadvantage of LEDs results from the nature of the diode, that is, the LED will only emit light when current flows in the correct direction. Accordingly, LEDs cannot just be directly connected to an alternating current (AC) source without experiencing blinking or flickering at the frequency of the AC source. The problem is compounded when the AC source is dimmer controlled by, for example, a phase control dimmer, which switches off parts of each cycle from the AC source.

It is therefore desirable to provide a dimmable LED driver that does not require replacement of previously installed conventional dimmers. Ideally the driver is of a simple and small design, while still being efficient when dimmed.

BRIEF SUMMARY OF THE INVENTION

Briefly stated, an embodiment of the present invention comprises a control circuit coupled to a power line controlled by a dimmer having a switching device. The control circuit includes a hold network that receives a variable input voltage from the dimmer-controlled power line and maintains a minimum hold current for the dimmer when the switching device is in an "on" state. A filter receives the variable input voltage and is configured to damp inductive-capacitive (LC) resonances. A bridge rectifier receives and converts the damped variable input voltage to a fixed polarity variable input voltage. A storage capacitor maintains fixed polarity variable input voltage for the control circuit. An active power factor correction circuit receives power from the bridge rectifier and the storage capacitor and draws an average continuous current when the switching device is in the "on" state. An LED power driving circuit receives a controlled current from the active power factor correction circuit and generates an output current. A rectifier and filter circuit receives the output current from the LED power driving circuit and generates a rectified and filtered output voltage. At least one LED receives the output voltage from the rectifier and filter circuit. The LED outputs visible light. A positive voltage feedback circuit senses a feedback voltage across the at least one LED, through the LED power driving circuit, and sends the feedback voltage to the active power factor correction circuit. A series regulator is electrically coupled to the LED power driving circuit and provides a regulated voltage to the control circuit. A pump back power circuit is electrically coupled to the LED power driving circuit and applies a bias voltage to an output of the bridge rectifier to power the active power factor correction circuit when the switching device is in an "off" state. An open loop protection circuit is configured to regulate output of the active power correction circuit when the at least one LED is not electrically coupled to the LED power driving circuit.

Another embodiment of the present invention comprises a control circuit coupled to a power line controlled by a dimmer having a switching device. The control circuit includes a hold network that receives a variable input voltage from the dimmer-controlled power line and maintains a minimum hold current for the dimmer when the switching device is in an "on" state. A filter receives the variable input voltage and is configured to damp LC resonances. A bridge rectifier receives and converts the damped variable input voltage to a fixed polarity variable input voltage. A storage capacitor maintains fixed polarity variable input voltage for the control circuit. An active power factor correction circuit receives power from the bridge rectifier and the storage capacitor and draws an average continuous current when the switching device is in the "on" state. A current controlled flyback transformer includes a primary winding, a load winding, and a sensory winding. Each of the load winding and the sensory winding is set to a phase, the phases of the load winding and the sensory winding being substantially equal. The primary winding receives a controlled current from the active power factor correction circuit and the load winding generates an output current. A rectifier and filter circuit receives the output current from the load winding and generates a rectified and filtered output voltage. At least one LED receives the output voltage from the rectifier and filter circuit. The LED outputs visible light. A positive voltage feedback circuit senses a feedback voltage across the at least one LED, through the current-controlled flyback transformer, and sends the feedback voltage to the active power factor correction circuit. The positive voltage feedback circuit is coupled to the sensory winding. A series regulator is electrically coupled to a series regulator winding of the current-controlled flyback transformer. The series regulator provides a regulated voltage to the control circuit. A pump back power circuit is electrically coupled to the LED power driving circuit that applies a bias voltage to an output of the bridge rectifier to power the active power factor correction circuit when the switching device is in an "off" state.

BRIEF DESCRIPTION OF THE DRAWINGS

The foregoing summary, as well as the following detailed description of preferred embodiments of the invention, will be better understood when read in conjunction with the appended drawings. For the purpose of illustration, there are shown in the drawings embodiments which are presently preferred. It should be understood, however, that the invention is not limited to the precise arrangements and instrumentalities shown.

DETAILED DESCRIPTION OF THE INVENTION

Figure 1:
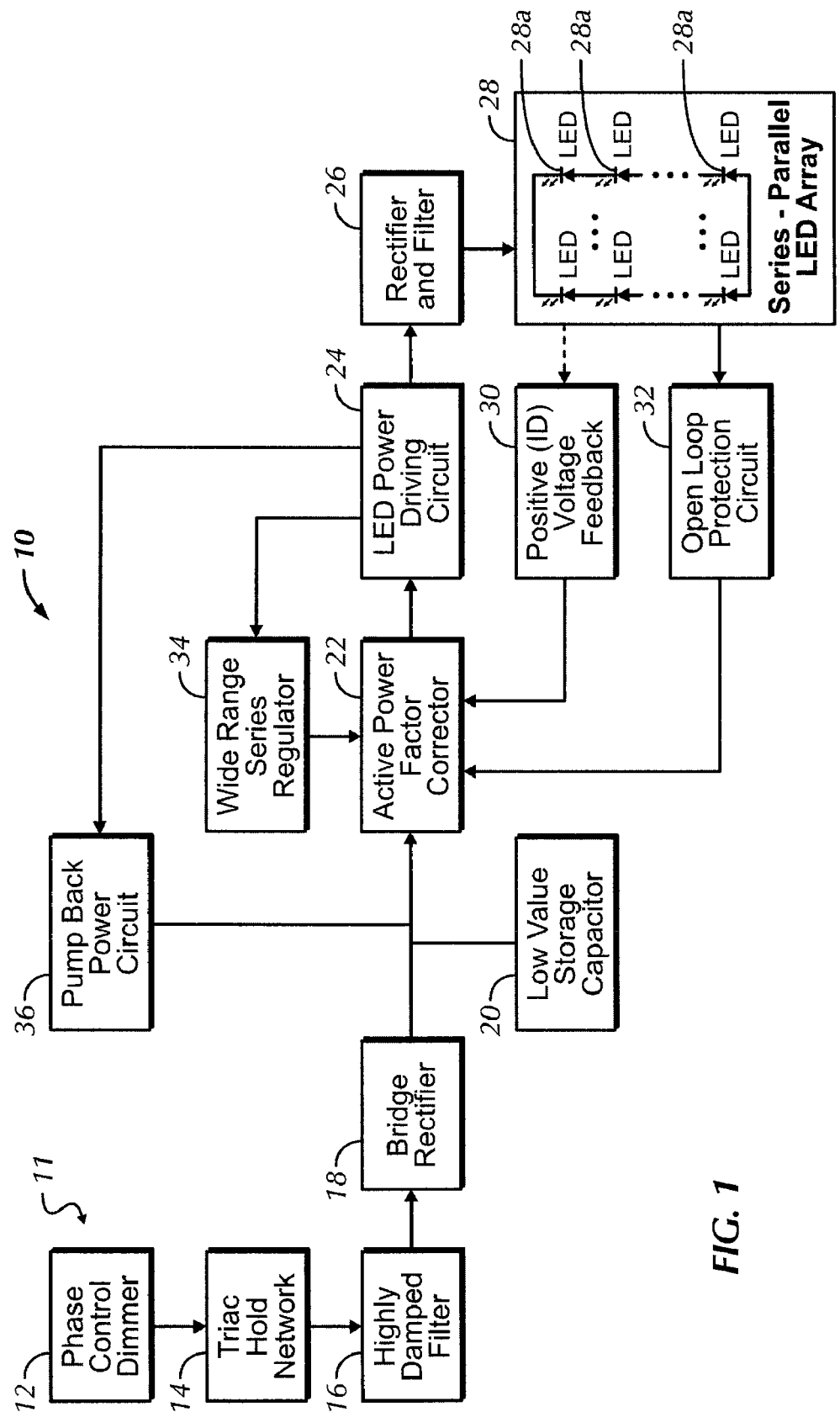
FIG. 1 is a schematic block diagram of an LED dimmer control circuit in accordance with a preferred embodiment of the present invention.

Certain terminology is used in the following description for convenience only and is not limiting. The words "right", "left", "lower", and "upper" designate directions in the drawings to which reference is made. The words "inwardly" and "outwardly" refer to directions toward and away from, respectively, the geometric center of the device and designated parts thereof. The terminology includes the above-listed words, derivatives thereof, and words of similar import. Additionally, the words "a" and "an", as used in the claims and in the corresponding portions of the specification, mean "at least one."

Referring to the drawings in detail, wherein the same reference numerals indicate like elements throughout, there is shown in FIG. 1 a schematic block diagram of an LED dimmer control circuit 10 in accordance with a preferred embodiment of the present invention. The control circuit 10 is coupled to a dimmer-controlled power line 11. The dimmer-controlled power line 11 preferably includes a phase control dimmer 12, functioning in either forward phase or reverse phase mode. However, the control circuit 10 may also be used with other types of dimmers, such as amplitude modulation dimmers and the like.

Typically, phase control dimmers 12 utilize a switching device, such as a triac, for switching off portions of each cycle of the alternating current (AC) voltage in the power line. Such triacs typically require a minimum hold current to remain in an "on" state. The minimum hold current is generally about 50 milliamperes (mA). When the triac is triggered, the input voltage rises and there may be a delay before portions of the control circuit 10 are fully functional. A delay could cause the triac to shut off prematurely. Accordingly, the control circuit 10 includes a hold network 14 that receives the AC input voltage from the dimmer-controlled power line 11 and maintains the minimum hold current for the dimmer 12 so that the triac stays "on" for the appropriate duration.

The AC input voltage passes from the hold network 14 to a filter 16, which is preferably highly damped. The filter 16 protects the triac from inductive-capacitive (LC) resonances, which may cause current reversals that shut the triac off prematurely. Once through the filter 16, the AC input voltage is rectified at bridge rectifier 18 to generate a variable direct current (DC) voltage. A storage capacitor 20 maintains the DC voltage for the control circuit 10. Otherwise, the bridge rectifier 18 would become reverse biased as the line voltage decreases and the current would drop to zero, again shutting off the triac prematurely. The storage capacitor 20 is preferably of low value, for example, on the order of nanofarads (nf).

The bridge rectifier 18 and storage capacitor 20 power an active power factor correction circuit 22. The active power factor correction circuit 22 draws a continuous, average current when the triac is in the "on" state. Thus, the bridge rectifier 18 remains forward biased and the triac remains "on." An LED power driving circuit 24 receives a controlled current from the active power factor correction circuit 22 and generates an output current. The LED power driving circuit 24 is preferably a current-controlled flyback transformer (see e.g., FIG. 2). The LED power driving circuit 24 could also be an electronic transformer, an inductor network, and the like.

The current output by the LED power driving circuit 24 passes through a rectifier and filter 26 before being output to an array 28 of LEDs 28a. In preferred embodiments, feedback from the LED array 28 is not performed directly. Rather, the voltage across the LED array 28 is indirectly sensed at the LED power driving circuit 24 and fed to the positive voltage feedback circuit 30. The positive voltage feedback circuit 30 enables the control circuit 10 to compensate for the current drop that occurs when the number of LEDs 28a in the array 28 increases. Positive feedback is used so that when the voltage increases due to having more LEDs 28a, the feedback also increases the output. Gain is set for the positive voltage feedback circuit 30 such that the current remains constant whether LEDs 28a are added or removed from the array 28.

If all of the LEDs 28a are removed from the array 28, no feedback would be supplied to regulate the output current causing the voltage to increase. Accordingly, an open loop protection circuit 32 is provided to regulate output of the active power factor correction circuit 22 in the event an open circuit condition is detected.

A series regulator 34 is coupled to the LED power driving circuit 24. The series regulator 34 preferably operates over a wide range of input voltages, for example, from about 5 volts (V) to about 60 V. The series regulator 34 is therefore capable of handling the wide range of voltages likely to be encountered when the control circuit 10 is being operated on a phase control dimmer 12.

A pump back power circuit 36 is also provided and is electrically coupled to the LED power driving circuit. When zero-crossing of the voltage on the dimmer-controlled power line 11 occurs, the phase control triac shuts off. The storage capacitor 20 quickly discharges, which shuts down the active power factor correction circuit 22. The pump back power circuit 36 prevents the shut down of the active power factor correction circuit 22 when the triac is "off" by applying by applying a bias voltage that is fed back to an output of the bridge rectifier 18. Current fluctuations causing LED light output flickering are thus avoided.

Accordingly, the control circuit 10 is configured to receive a variable input from a dimmer-controlled power line 11 which is controlled by conventional dimmers 12 and thereby variably drive LEDs 28a.

All or portions of the control circuit 10 may be implemented in a microprocessor, a microcontroller, an application specific integrated circuit (ASIC), a programmable logic array (PLA), or the like.

Figure 2:
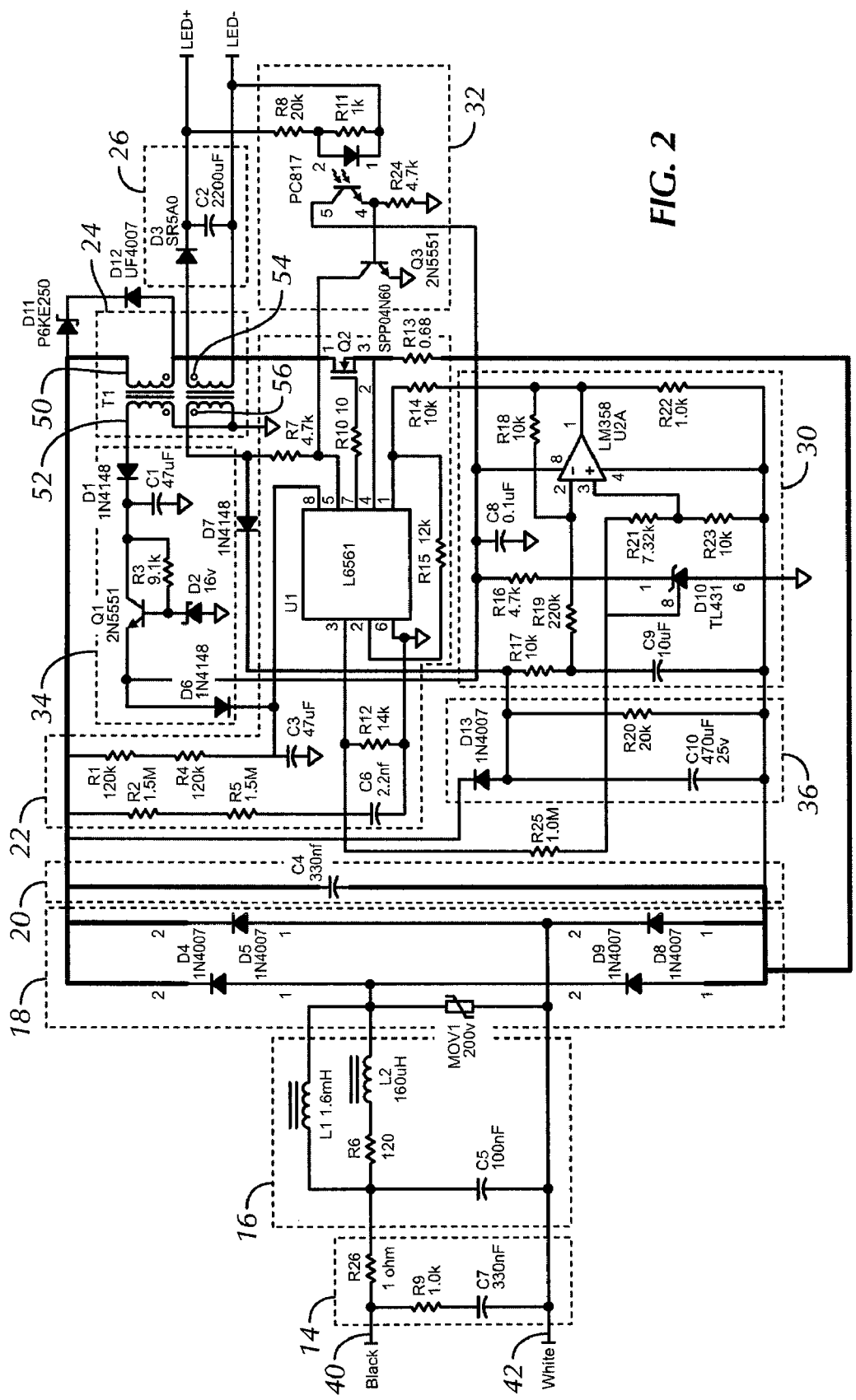
FIG. 2 is an electrical schematic diagram of one possible detailed implementation of an LED dimmer control circuit in accordance with a preferred embodiment of the present invention.

FIG. 2 shows one possible detailed circuit implementation of a control circuit 10 in accordance with a preferred embodiment of the present invention. Line inputs 40, 42 from the dimmer-controlled power line 11 are coupled to the control circuit 10. The hold network 14 includes a capacitor C7 and a resistor R9 electrically coupled between the input lines 40, 42. A resistor R26 is also coupled to the input line 40 within the hold network 14. Filter 16 includes a pair of iron-core inductors L1, L2 in parallel, as well as a capacitor C5 and resistor R6.

The damped AC input voltage is rectified by diodes D4, D5, D8, D9 and filtered by the storage capacitor 20 comprising capacitor C4. Capacitor C4 preferably has a value of about 330 nf. The rectified DC voltage passes to the active power correction circuit 22, including a power factor corrector U1, preferably a L6561 manufactured by ST Microelectronics. The active power correction circuit also includes suitable biasing resistors R2, R5, R12, R15, R14, R13, R10, R7, R4, R1; capacitors C6, C3; and transistor Q2.

The active power factor correction circuit 22 supplies a controlled current to a primary winding 50 in the LED power driving circuit 24. The primary winding 50 inductively powers a load winding 54, which provides an output current that is rectified and filtered by diode D3 and capacitor C2 prior to being passed onto the LED array 28.

The voltage across the LED array 28 is sensed, as described above, indirectly. Preferably, a sensory winding 56 within the LED power driving circuit 24 is clamped to the same voltage and is set to the same phase as the load winding 54. Thus, the voltage moves through diode D7 into the positive voltage feedback circuit 30. The voltage passes through resistor R17 and capacitor C9 into an operational amplifier U2A, preferably an LM358 manufactured by National Semiconductor Corporation. The output is sent to the active power factor correction circuit 22 where, via resistor R14, the output is fed into a voltage sensor input of the power factor corrector U1. The active power correction circuit 22 adjusts the voltage supplied to the load winding 54 accordingly.

The open loop protection circuit 32 primarily includes a photocoupler PC817. When no LEDs 28a are present in the array 28, the light emitter portion of the photocoupler PC817 will pulse and be detected by the photodiode portion, feeding a current via transistor Q3 into a zero detection input of the power factor corrector U1 in the active power factor correction circuit 22. The open loop correction circuit 32 regulates the active power factor correction circuit 22 to about 25 V. Open loop correction circuit also includes resistors R8, R11, R24.

The series regulator 34 is electrically coupled to a series regulator winding 52 in the LED power driving circuit 24. The induced current is received by the series regulator winding 52 and passed through the collection of diode D1, capacitor C1, transistor Q1, zener diode D2, and resistor R3 for providing a regulated voltage to the control circuit 10. The regulated voltage is passed back to the active power factor correction circuit 22.

The pump back power circuit 36 preferably includes a diode D13, resistor R20, and a high value storage capacitor C10. The capacitor C10 may have a value of about 40 microfarads (μf) to about 1000 μf, but preferably has a value of about 470 μf. The capacitor C10 is charged while the triac is in the "on" state so that power may be supplied to output of the bridge rectifier 18 once the triac shuts off and the low value storage capacitor 20 discharges.

From the foregoing, it can be seen that embodiments of the present invention comprise a method and control circuit for controlling LEDs, and particularly for dimming LEDs using from conventional dimmers. It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A control circuit coupled to a power line controlled by a dimmer having a switching device, the control circuit comprising:
   (a) a hold network that receives a variable input voltage from the dimmer-controlled power line and maintains a minimum hold current for the dimmer when the switching device is in an "on" state;
   (b) a filter that receives the variable input voltage and is configured to damp inductive-capacitive (LC) resonances;
   (c) a bridge rectifier that receives and converts the damped variable input voltage to a fixed polarity variable input voltage;
   (d) a storage capacitor that maintains fixed polarity variable input voltage for the control circuit;
   (e) an active power factor correction circuit that receives power from the bridge rectifier and the storage capacitor and draws an average continuous current when the switching device is in the "on" state;
   (f) a light emitting diode (LED) power driving circuit that receives a controlled current from the active power factor correction circuit and generates an output current;
   (g) a rectifier and filter circuit that receives the output current from the LED power driving circuit and generates a rectified and filtered output voltage;
   (h) at least one LED that receives the output voltage from the rectifier and filter circuit, the at least one LED outputting visible light;
   (i) a positive voltage feedback circuit that senses a feedback voltage across the at least one LED, through the LED power driving circuit, and sends the feedback voltage to the active power factor correction circuit;
   (j) a series regulator electrically coupled to the LED power driving circuit, the series regulator providing a regulated voltage to the control circuit;
   (k) a pump back power circuit electrically coupled to the LED power driving circuit that applies a bias voltage to an output of the bridge rectifier to power the active power factor correction circuit when the switching device is in an "off" state; and
   (l) an open loop protection circuit that is configured to regulate output of the active power correction circuit when the at least one LED is not electrically coupled to the LED power driving circuit.

2. The control circuit of claim 1, wherein the LED power driving circuit is a current-controlled flyback transformer.

3. The control circuit of claim 2, wherein the current controlled flyback transformer includes a load winding electrically coupled to the rectifier and filter and a sensory winding electrically coupled to the positive voltage feedback circuit, each of the load winding and the sensory winding being set to a phase, the phases of the load winding and the sensory winding being substantially equal.

4. The control circuit of claim 1, wherein the dimmer is a phase control dimmer.

5. The control circuit of claim 1, wherein the switching device is a triac.

6. The control circuit of claim 1, wherein the series regulator operates from about 5 volts to about 60 volts.

7. The control circuit of claim 1, wherein the pump back power circuit includes a capacitor having a capacitance from about 40 microfarads to about 1000 microfarads.

8. A control circuit coupled to a power line controlled by a dimmer having a switching device, the control circuit comprising:
   (a) a hold network that receives a variable input voltage from the dimmer-controlled power line and maintains a minimum hold current for the dimmer when the switching device is in an "on" state;
   (b) a filter that receives the variable input voltage and is configured to damp inductive-capacitive (LC) resonances;
   (c) a bridge rectifier that receives and converts the damped variable input voltage to a fixed polarity variable input voltage;
   (d) a storage capacitor that maintains fixed polarity variable input voltage for the control circuit;

(e) an active power factor correction circuit that receives power from the bridge rectifier and the storage capacitor and draws an average continuous current when the switching device is in the "on" state;

(f) a current controlled flyback transformer having a primary winding, a load winding, and a sensory winding, each of the load winding and the sensory winding being set to a phase, the phases of the load winding and the sensory winding being substantially equal, the primary winding receives a controlled current from the active power factor correction circuit and the load winding generates an output current;

(g) a rectifier and filter circuit that receives the output current from the load winding and generates a rectified and filtered output voltage;

(h) at least one light emitting diode (LED) that receives the output voltage from the rectifier and filter circuit, the at least one LED outputting visible light;

(i) a positive voltage feedback circuit that senses a feedback voltage across the at least one LED, through the current-controlled flyback transformer, and sends the feedback voltage to the active power factor correction circuit, the positive voltage feedback circuit being coupled to the sensory winding;

(j) a series regulator electrically coupled to a series regulator winding of the current-controlled flyback transformer, the series regulator providing a regulated voltage to the control circuit; and (k) a pump back power circuit electrically coupled to the current-controlled flyback transformer that applies a bias voltage to an output of the bridge rectifier to power the active power factor correction circuit when the switching device is in an "off" state.

* * * * *